(12) United States Patent
Neelakantan et al.

(10) Patent No.: US 8,577,338 B2
(45) Date of Patent: Nov. 5, 2013

(54) MESSAGING WITH MEDIA INTEGRATION

(75) Inventors: Radha Neelakantan, Sunnyvale, CA (US); Peter Fry, Andover, MA (US); Richard J. Donald, Brentwood, CA (US); Manisha D. Parekh, Mountain View, CA (US); David G. Champlin, San Diego, CA (US); Lang S. Chen, Oakland, CA (US); Benoit Boningue, Mountain View, CA (US); Ryan Case, Sunnyvale, CA (US)

(73) Assignee: Palm, Inc., Sunnyvale, CA (US)

( * ) Notice: Subject to any disclaimer, the term of this patent is extended or adjusted under 35 U.S.C. 154(b) by 997 days.

(21) Appl. No.: 11/848,560

(22) Filed: Aug. 31, 2007

(65) Prior Publication Data

US 2009/0061824 A1 Mar. 5, 2009

(51) Int. Cl.
*H04Q 7/22* (2006.01)

(52) U.S. Cl.
USPC .................................. 455/412.1; 455/566

(58) Field of Classification Search
USPC ......... 455/412.1, 414.1, 550.1, 566; 709/204, 709/205, 206, 227
See application file for complete search history.

(56) References Cited

U.S. PATENT DOCUMENTS

| | | | |
|---|---|---|---|
| 2003/0061285 A1* | 3/2003 | Usui et al. | 709/205 |
| 2003/0208543 A1 | 11/2003 | Enete et al. | |
| 2005/0136886 A1* | 6/2005 | Aarnio et al. | 455/404.2 |
| 2005/0208962 A1* | 9/2005 | Kim | 455/550.1 |
| 2006/0041627 A1* | 2/2006 | Tu | 709/206 |
| 2006/0041672 A1 | 2/2006 | Day et al. | |
| 2006/0041848 A1 | 2/2006 | Lira | |
| 2006/0195514 A1 | 8/2006 | Rogers et al. | |
| 2008/0195470 A1* | 8/2008 | Ferrer | 705/14 |
| 2008/0205205 A1* | 8/2008 | Chiang et al. | 369/30.04 |

FOREIGN PATENT DOCUMENTS

| | | |
|---|---|---|
| KR | 1020060039497 | 5/2006 |
| WO | 2009029714 A1 | 3/2009 |

OTHER PUBLICATIONS

Supplementary European Search Report; mailed Dec. 14, 2011; issued in related application No. PCT/US2008074627.

* cited by examiner

*Primary Examiner* — Patrick Edouard
*Assistant Examiner* — Myron K Wyche

(57) ABSTRACT

Techniques involving messaging applications are disclosed. For example, an apparatus may include a communications interface module and a messaging module. The communications interface module may receive an incoming message of a conversation thread that is originated by a remote device. The incoming message includes a text portion and an attached media item. The messaging module automatically outputs the incoming message to a user interface in an output format. This output format includes both the text portion and content of the attached media item. The attached media item may be of various types. Examples of media items include video files, audio files, image files, resource locators, and application files. The embodiments, however are not limited to these examples.

18 Claims, 7 Drawing Sheets

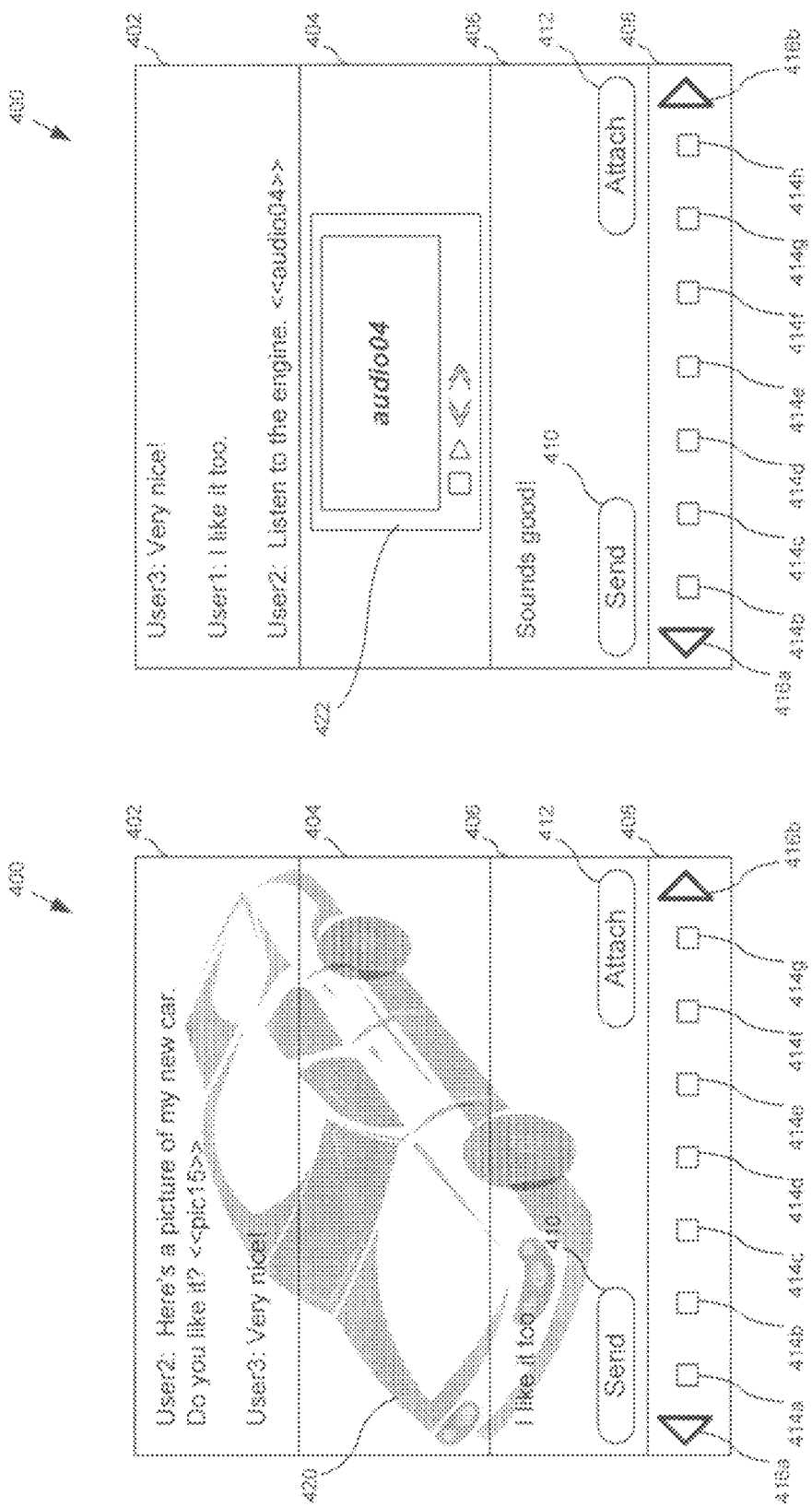

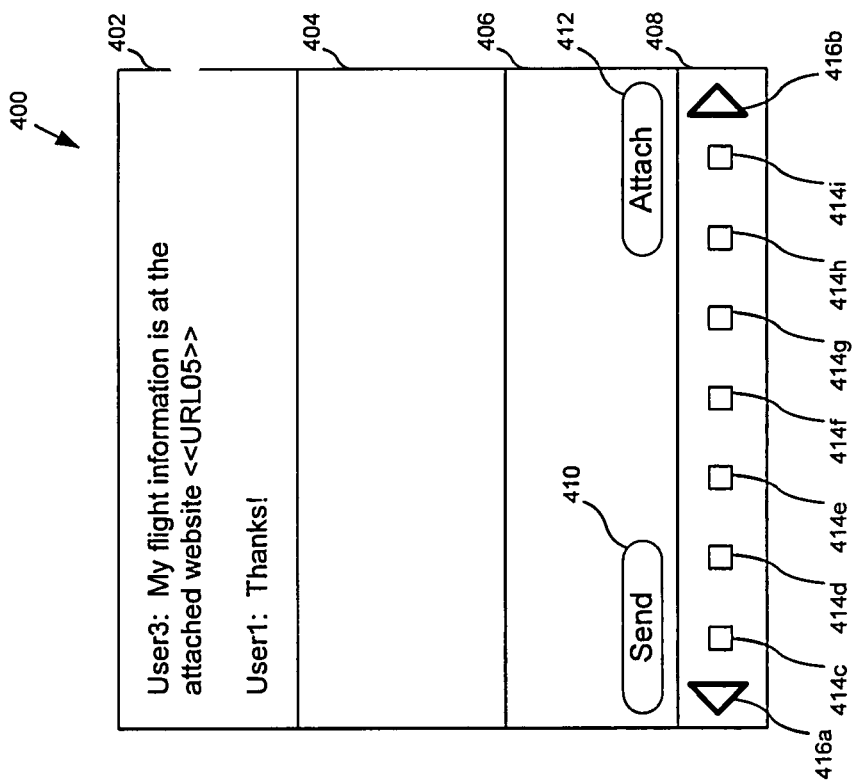
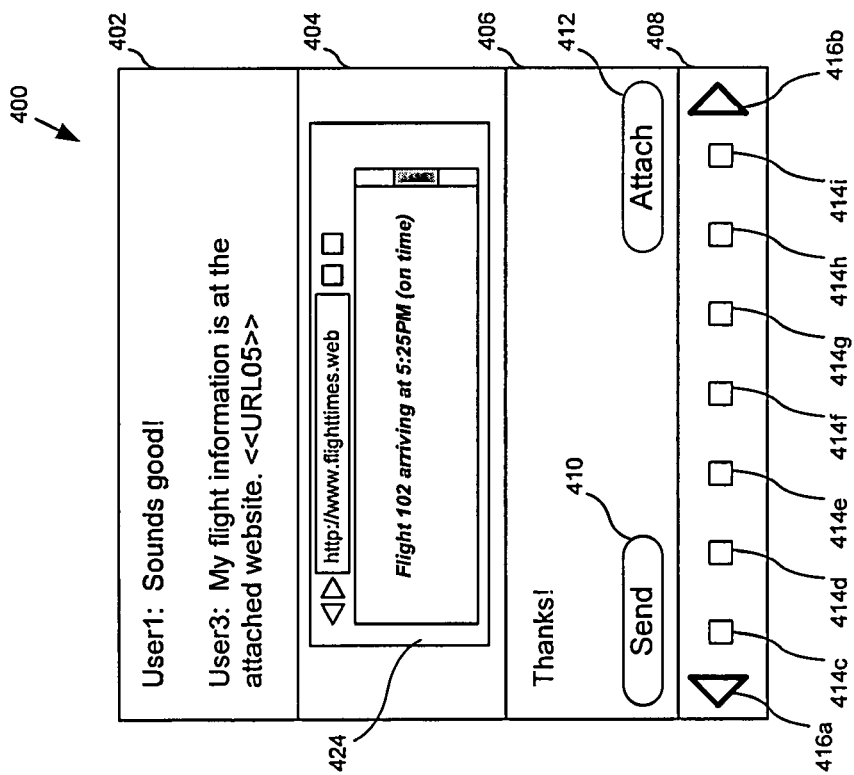
FIG. 4D
FIG. 4E

MESSAGING WITH MEDIA INTEGRATION

BACKGROUND

Messaging has become a popular method of communication among a wide range of user segments. One reason for this popularity is the ability of messaging to fit nicely between phone calls and e-mail. More particularly, messaging communications are not as intrusive as phone calls and are not as asynchronous as e-mail. Users may employ messaging applications (such as instant messaging (IM) applications and mobile messaging applications) to "chat".

While chatting, a user may want to convey information to someone that is better displayed graphically than in a text-based message. For example, a user may wish to send someone a list of movie times for all theaters in a particular area. As a further example, a user may wish to send someone flight tracking information so the recipient may determine when the flight will land. In such cases, it would be desirable to send rich data (e.g., text and media) that a recipient could render and consume in a convenient way. Thus, with reference to the above examples, such rich data could make viewing movie listings, buying movie tickets, and/or obtaining updates about a flight's status more convenient.

Current techniques for sending rich data may involve, for example, sending a text message containing a uniform resource locator (URL) that identifies the rich data. Upon receipt of this message, the user can use the URL to access the resource (e.g., a web page) through a browser application and refresh the resource to get updates.

However, if a URL is sent in a text message, the user has to leave the context of the conversation to access the rich data in a different application, such as a browser.

Additionally, current messaging applications do not provide techniques for consolidating messages and media into a chat context after a chat has occurred. For example, it is logistically impractical for all participants in a chat to get into a room and look at one computer together.

BRIEF DESCRIPTION OF THE DRAWINGS

FIGS. 4A-4E are diagrams showing exemplary interface techniques.

DETAILED DESCRIPTION

Various embodiments may be generally directed to techniques for the exchange of messages among devices. For instance, an apparatus may include a communications interface module and a messaging module. The communications interface module may receive an incoming message of a conversation thread that is originated by a remote device. The incoming message includes a text portion and an attached media item. The messaging module automatically outputs the incoming message to a user interface in an output format. This output format includes both the text portion and content of the attached media item. The attached media item may be of various types. Examples of media items include video files, audio files, image files, resource locators, and application files. The embodiments, however are not limited to these examples.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements. It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

Figure 1:
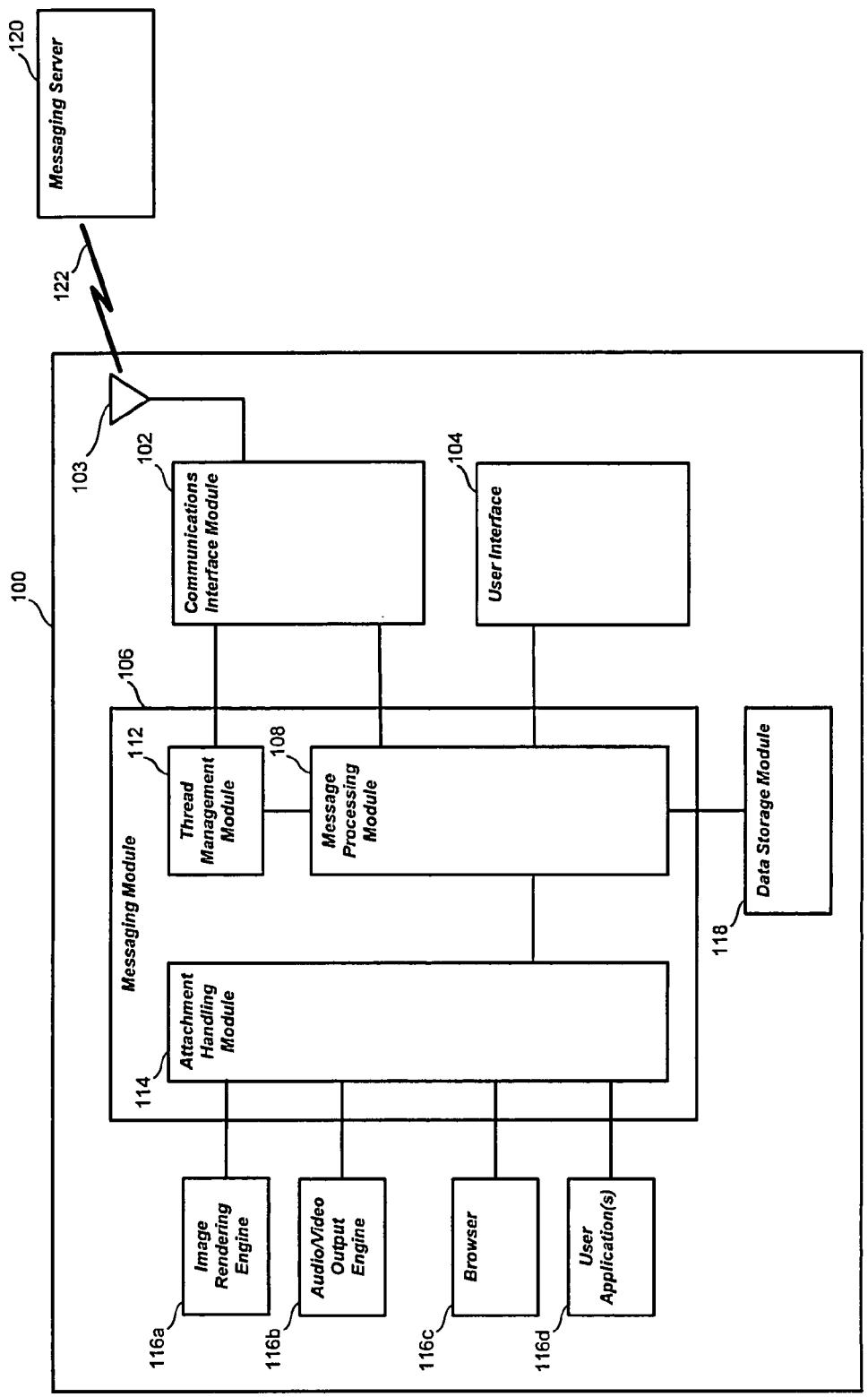
FIG. 1 illustrates an embodiment of an apparatus.

FIG. 1 illustrates one embodiment of an apparatus 100 that may exchange messages (e.g., instant messages) with one or more remote devices. Apparatus 100 may be included in various devices. Exemplary devices include computing devices, such as desktop, laptop, and notebook computers. Further exemplary devices include personal digital assistants (PDAs), mobile phones, smartphones, mobile internet devices, and so forth. The embodiments, however, are not limited to these examples.

As shown in FIG. 1, apparatus 100 may include various elements. For instance, FIG. 1 shows that apparatus 100 may include a communications interface module 102, a user interface 104, a messaging module 106, multiple content generation modules 116a-d, and a storage medium 118. These elements may be implemented in hardware, software, firmware, or in any combination thereof.

Communications interface module 102 provides for the exchange of information with other devices. For instance, communications interface module 102 may receive incoming messages originated by remote devices and transmit outgoing messages. Such messages may be mobile messages and/or instant messages (IMs). However, embodiments may handle other types of messages, such as short message service (SMS) messages and/or multimedia message service (MMS) messages. The embodiments, however, are not limited to these examples.

As an example, FIG. 1 shows communications interface module 102 (through an antenna 103) exchanging information with a messaging server 120. FIG. 1 further shows that this exchange occurs across a link 122 of a wireless network. Exemplary wireless networks include wireless local area network (WLAN) links, such as IEEE 802.11 WiFi links, as well as wireless metropolitan area (WMAN) links such as IEEE 802.16 WiMax links and IEEE 802.16e WiBro links. Also, wireless networks may include personal area networks (PAN) links such as Bluetooth links. Further, wireless networks may include radio frequency identification (RFID) links. Moreover, such wireless networks may include cellular and satellite communications systems. The embodiments, however, are not limited to these examples of wireless networks.

Moreover, communications interface module 102 may additionally or alternatively communicate (e.g., exchange messages) with devices across wired networks. Exemplary wired networks include, for example, local area networks (LANs), such as IEEE 802.3 Ethernet networks, and/or wired telephony networks. The embodiments, however, are not limited to these examples.

To provide such features, communications interface module 102 may include electronics, such as modulators, demodulators, amplifiers, filters, and/or antennas. The embodiments, however, are not limited to these examples.

Moreover, communications interface module 102 may include components and/or functionality to operate according to one or more protocol layers. Such protocol layers may provide features, such as packet encapsulation/decapsulation, error correction encoding/decoding, signaling, and/or link protocols. Embodiments, however, may include other components and/or functionality. These features may be implemented in hardware, software, firmware, or any combination thereof.

User interface 104 facilitates user interaction. This interaction may involve the input of information from a user and/or the output of information to a user. Accordingly, user interface 104 may include one or more devices, such as a keyboard (e.g., a full QWERTY keyboard), a keypad, a display (e.g., a touch screen), a microphone, and/or an audio speaker. The embodiments, however, are not limited to these examples.

FIG. 1 shows that messaging module 106 is coupled to communications interface module 102 and user interface 104. Messaging module 106 receives incoming messages from communications interface module 102. In addition, messaging module 106 provides communications interface module 102 with messages to be sent to remote devices. As shown in FIG. 1, messaging module 106 may include a message processing module 108, a thread management module 112, and an attachment handling module 114.

Message processing module 108 performs various operations regarding incoming and outgoing messages. Thus, message processing module 108 obtains incoming messages that communications interface module 102 receives from remote device(s). Also, message processing module 108 forwards user-generated outgoing messages to communications interface module 102 for sending to remote device(s).

Further, message processing module 108 provides for the output of incoming messages to user interface 104. As described above, this may involve an output format that provides both message text and attached media item content together.

Also, message processing module 108 provides for a user to generate and send outgoing messages. This may involve providing techniques for the user, through user interface 104, to input (e.g., type) message text and also to attach media items to messages. For instance, such features may include providing a text entry and editing window or field to be displayed by user interface 104. Examples of such windows and fields are described below with reference to FIGS. 4A-4E.

Incoming messages received by apparatus 100 may include text portions and attached media items. In embodiments, such incoming messages are automatically outputted to user interface 104 in an output format that provides both message text and attached media item content. Content generation modules 116 may generate the content for such attached media items.

As shown in FIG. 1, apparatus 100 may include multiple content generation modules 116 to handle various types of media attachments. For instance, FIG. 1 shows apparatus 100 including an image rendering engine 116a to handle image attachments, an audio/video output engine 116b to handle audio and video attachments, a browser to handle network resources (e.g., web pages), and user application(s) 116d to handle attachments that are application files (e.g., spreadsheets, word processing documents, and so forth).

Attachment handling module 114 facilitates outputting the content of media attachments. Thus, for media attachments of incoming messages, attachment handling module 114 selects an appropriate content generation module 116 to generate the corresponding content. This selection may be based on characteristics of the attached items. Also, this selection may be based on metadata included in the message that identifies the media item's type and/or format.

In addition, attachment handling module 114 may send the attachment to the selected content generation module 116. In turn, the selected content generation module 116 may generate the content and output it to user interface 104. This outputting to user interface 104 may be directly or through messaging module 106 (e.g., through attachment handling module 114 and/or message processing module 108).

For example, when an incoming message has an attached image file, attachment handling module 114 may receive the attachment from message processing module 108 and select image rendering engine 116a. Image rendering engine 116a then receives the attachment and provides its content for display by user interface 104. However, when an incoming message has an attached audio or video file, attachment handling module 114 may receive the attachment from message processing module 108 and select audio/video output engine 116b. Based on this selection, audio/video output engine 116b generates the corresponding content. This may involve audio/video output engine 116b executing a media player, which a user (through user interface 104) may operate to play the content.

In embodiments, attachments may include on-line resources, such as web pages. Therefore, a message may have an attached media item in the form of a resource identifier (e.g., a uniform resource locator (URL)) that identifies a network resource (such as a web page). Upon receiving such an attachment from message processing module 108, attachment handling module 114 may select browser 116c to retrieve the resource. In turn, browser 116c may output the resource to user interface 104. This may further involve browser 116c providing a browser interface to allow the user to perform various operations (e.g., navigation, scrolling, etc,).

The messages exchanged by apparatus 100 may be associated with conversation threads. Conversation threads involve the exchange of messages among an associated group of user devices. These user devices are also referred to as members of the conversation thread. During the existence of a conversation thread (a conversation thread may have a beginning and an end), each of the members may send messages that are distributed among the members. Thus, each conversation thread member may receive the same sequence of messages.

FIG. 1 shows that thread management module 112 is coupled to message processing module 108 and communications interface module 102. Thread management module 112 performs various operations involving the establishment of conversation threads. For instance, thread management module 112 may generate messages pertaining to conversation threads. These messages are then transmitted to one or more remote devices (e.g., to messaging server 120). Examples of such messages include messages establishing new conversation threads, messages inviting other devices to participate in a conversation thread, messages accepting or declining an invitation to join a conversation thread, messages altering the membership of a conversation thread, and messages terminating a conversation thread. These messages are provided as examples. Thus, other messages may be employed.

Moreover, thread management module 112 may receive (from communications interface module 102) messages originated by remote devices pertaining to conversation threads. Examples of such messages include invitations to join a conversation thread, messages indicating a start of a conversation thread, and messages indicating the termination of a conversation thread. The embodiments, however, are not limited to these messages.

Storage medium 118 may store information such application documents, e-mails, media items (e.g., image files, audio files, video files, etc.), and so forth. Such information may be stored in various encoded or unencoded formats. Storage medium 118 may be implemented using any machine-readable or computer-readable media capable of storing data, including both volatile and non-volatile memory. Examples of such media are provided below.

In generating outgoing messages, a user may obtain media item attachments from storage medium 118. Also, storage medium 118 may store messages (e.g., text and attached media items). Such messages may be stored individually or as part of a stored conversation thread. Moreover, storage medium 118 may store control logic or instructions (e.g., software) that may be executed by one or more processors to provide various features described herein.

In general operation, apparatus 100 may participate in various distributed messaging applications. For instance, apparatus 100 may provide operations and features for a messaging client. For instance, as a messaging client, messaging module 106 may provide for the exchange of messages with other user devices via a messaging server. A further example of a client-server messaging scenario is described below with reference to FIG. 2.

As described above, the elements of FIG. 1 may be implemented in hardware, software, firmware, or any combination thereof. Thus, implementations may include one or more processors that execute instructions or control logic stored in a storage medium (e.g., memory) included in apparatus 100. The embodiments, however, are not limited to such implementations.

Embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. The embodiments are not limited in this context.

Figure 2:
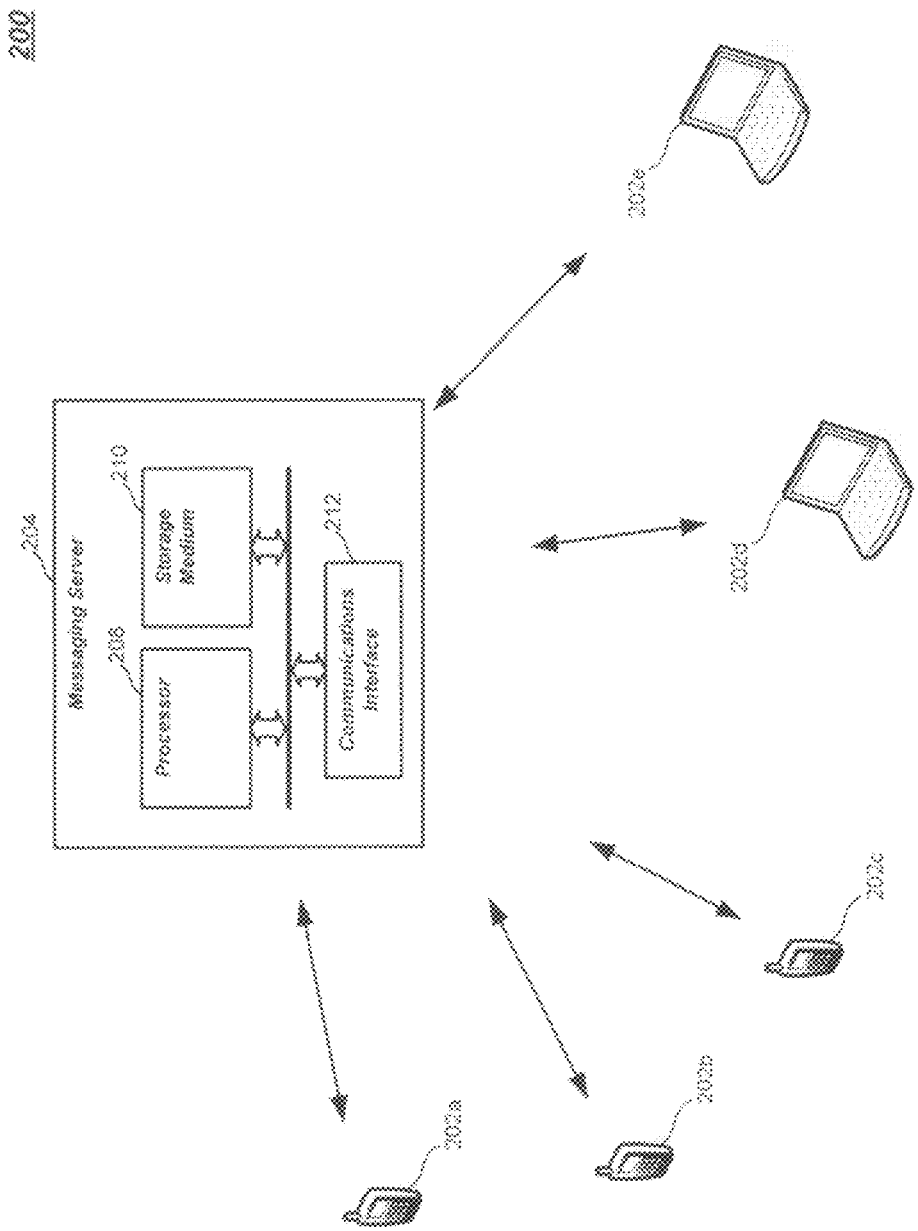
FIG. 2 is a diagram of an exemplary operational scenario.

FIG. 2 is a diagram of an exemplary operational environment. This environment includes multiple user devices 202a-e and a messaging server 204. Together, these devices may exchange messages (e.g., mobile messages, instant messages, SMS messages, MMS messages, etc.) across one or more networks. As described herein, such messages may include attached media items.

In addition, embodiments may exchange messages that are associated with conversation threads. In the context of FIG. 2, an exemplary conversation thread may include user devices 202a-e. Thus, when a particular user device of the conversation thread (for example, user device 202a) generates an outgoing message, the user device sends the message to messaging server 204. Upon receipt, messaging server 204 may forward the message to the other user devices of the conversation thread. In this example, these other devices of the conversation thread are user devices 202b-202e. In addition, messaging server 204 may also send the message back to user device 202a so that will receive the same sequence of messages that the other user devices receive.

Moreover, messaging server 202 may store the messages of a conversation thread. Through this feature, user devices may receive the conversation thread messages. This may involve, for example, a replaying of the conversation thread in which messaging server 202 transmits the messages (as well as any attached media items) to a requesting user device. Additionally or alternatively, this may involve a download (a "bulk download") of an entire conversation thread (e.g., all messages and attached media items) to a requesting user device.

One or more of user devices 202a-e may be implemented in the manner of apparatus 100 in FIG. 1. The embodiments, however, are not limited to such implementations.

FIG. 2 shows that messaging server 204 may include a processor 208, a storage medium 210, and a communications interface 212. These elements may be implemented in hardware, software, firmware, or any combination thereof.

Processor 208 may include one or more processing elements (e.g., one or more microprocessors). Processor 208 may execute control logic or instructions (e.g., software) that may provide functionality for the messaging features described herein.

Storage medium 210 may store such control logic or instructions. Storage medium 210 may be implemented using any machine-readable or computer-readable media capable of storing data, including both volatile and non-volatile memory. Examples of such media are provided below.

In addition, storage medium 210 may store exchanged messages for subsequent access. For example, messaging server 204 may store entire conversation threads in storage medium 210. This feature provides users with subsequent access to conversation threads. For instance, users may download particular messages (along with any attached media items) for viewing and/or local storage. Additionally or alternatively, users may download entire conversation threads for viewing and/or local storage.

Communications interface 212 may provide for the exchange of information (e.g., messages) with user devices 202a-e. Accordingly, communications interface 212 may include components to communicate across various network(s), such as the wired or wireless networks described above with reference to FIG. 1. To provide such features, communications interface 212 may include electronics, such as modulators, demodulators, amplifiers, filters, and/or antennas. The embodiments, however, are not limited to these examples.

Moreover, communications interface 212 may include components and/or functionality to operate according to one or more protocol layers. Such protocol layers may provide features, such as packet encapsulation/decapsulation, error correction coding, signaling, and/or link protocols. Embodiments, however, may include other components and/or functionality. These features may be implemented in hardware, software, firmware, or any combination thereof.

Figure 3:
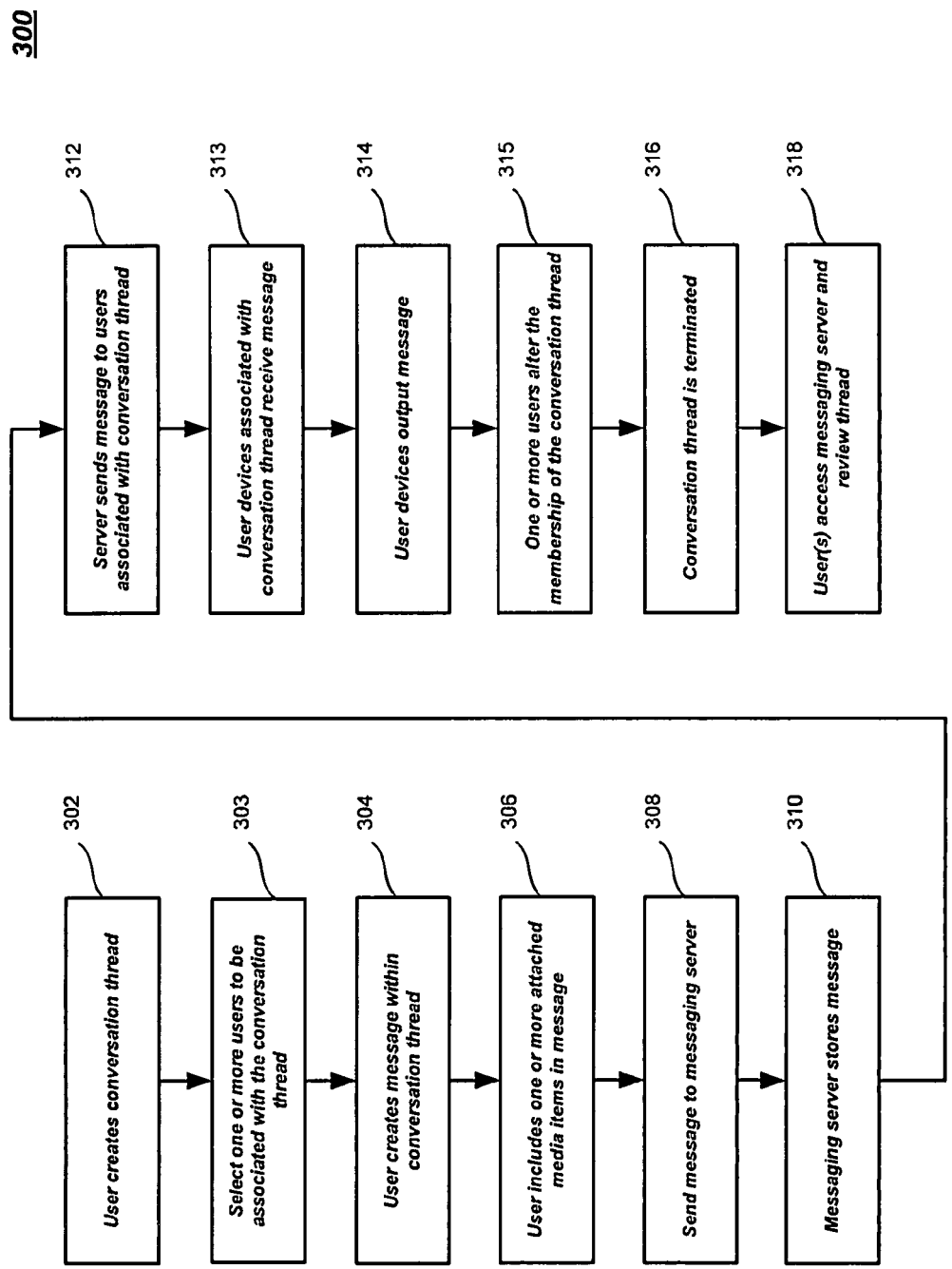
FIG. 3 illustrates an embodiment of a logic flow.

FIG. 3 illustrates one embodiment of a logic flow. In particular, FIG. 3 illustrates a logic flow 300, which may be representative of the operations executed by one or more embodiments described herein. Although FIG. 3 shows a particular sequence, other sequences may be employed. Also, the depicted operations may be performed in various parallel and/or sequential combinations.

As shown in logic flow 300, a conversation thread is created at a block 302. With reference to FIG. 1, this thread may be created, for example, by a user of apparatus 100. The embodiments, however, are not limited to this context. This conversation thread may have multiple participants. Accordingly, at a block 303, the user may select one or more participants (e.g., users of other devices) for the conversation thread.

The creation of the conversation thread and the selection of its members may involve the exchange of various messages. Such messages may be exchanged with a messaging server, as well as with multiple user devices (e.g., through the messaging server). In the context of FIG. 1, thread management module 112 may send and receive such messages via communications interface module 102.

At a block 304, a participant of the conversation thread (e.g., the user of apparatus 100) may create a message associated with the conversation thread. This message may include a text portion. Further, as indicated by a block 306, the user may attach one or more media items to the message. Examples of media items include pictures (e.g., photographs), videos, audio, application files, and so forth.

The message (i.e., its text and its one or more attached media items) may be transmitted to a messaging server (e.g., messaging server 120 or messaging server 204) at a block 308. Upon receipt, the messaging server forwards the message and its attached media item(s) to the members of the conversation thread established at block 303.

In addition, the messaging server stores the message and its attached media item(s) at a block 310. In the context of FIG. 2, this may involve messaging server 202 storing the message in storage medium 210. The embodiments, however, are not limited to this context. This storing maintains the context of the message and its attached item(s) within the thread. Thus, at a later time, the conversation thread can be presented in a same or similar format as the original "live" conversation was displayed to the users.

At a block 312, the messaging server sends the message (e.g., text and attached item(s)) to members of the conversation thread. Accordingly, these members receive the message at a block 313.

Upon receipt, the devices output (e.g., display) the message. For instance, the devices may output message text and content of attached items together in a convenient manner at a block 314. Details regarding the output of messages are provided below with reference to FIGS. 4A-4E.

As indicated by a block 315, one or more users may alter the membership of the conversation thread. This may involve adding or deleting one or more current thread members. More particularly, this may involve a user generating a control message and sending it to the messaging server. Upon receipt, the messaging server may reflect this change and forward it to the members (including any new members) in a message. As described above, thread management module 112 of apparatus 100 may handle the exchange of such messages. The embodiments, however, are not limited to this example.

One or more of blocks 304 through 315 may be repeated multiple times. Thus, one or more users (through their devices) may generate messages (with or without attachments) for distribution by the messaging server in accordance with the conversation thread.

However, at a block 316, the conversation thread may be terminated by one or more users. This may involve one or more users through their device(s) (e.g., through thread management module 112) generating thread termination message (s), and sending them to the messaging server. Upon receipt, the messaging server may reflect this change and forward the termination message to the members. As described above, through thread management module 112 may handle the exchange of such messages. The embodiments, however, are not limited to this example.

At this point, the messaging server has stored (in accordance with block 310) the messages and attachments of the conversation thread. Thus, as indicated by a block 318, a user may access the server and review the thread. For instance, a user may scroll through all messages and attachments in a same or similar manner as they were originally displayed to the users.

Figure 4A:
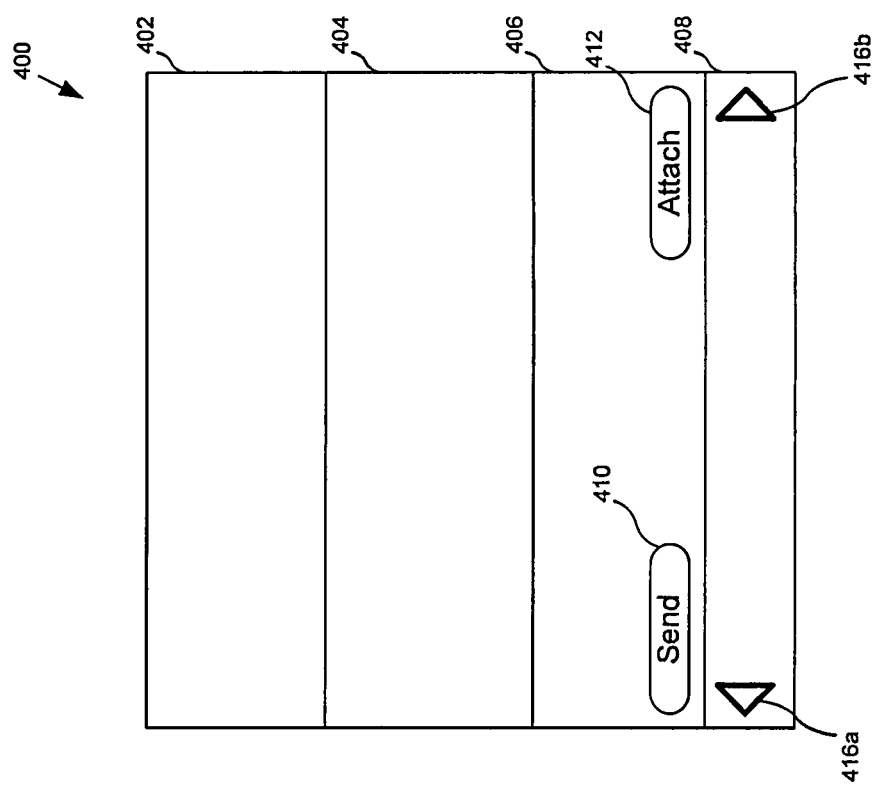

FIGS. 4A-4E are diagrams showing exemplary interface techniques. For instance, FIG. 4A is a view of an exemplary graphical user interface (also referred to as an interface console) 400. Interface console 400 allows for the viewing of incoming messages and the preparation of outgoing messages. In the context of FIG. 1, interface console 400 may be displayed (e.g., by messaging module 106) on user interface 104.

As shown in FIG. 4A, interface console 400 includes an incoming message text field 402, a media item field 404, an outgoing message input field 406, and a media item history field 408.

Incoming message text field 402 displays the text of incoming messages. In addition, incoming message text field 402 may indicate the originator of each message and whether each message has an attached media item. Such messages may be displayed in a manner that scrolls vertically within field 402.

Media item field 404 provides for the output of attached media item content. Thus, within this field, media item content may be provided. For instance, images (or portions of images) may be displayed in media item field 404. Also, tools for consuming media content (e.g., media players, browsers, and so forth) may be displayed in media item field 404.

Outgoing message input field 406 provides for a user to input and send outgoing messages. Accordingly, field 406 displays the text of such messages as they are being input (e.g., through typing or keypad entry). As shown in FIG. 4A, outgoing message input field 406 includes a graphical send button 410. When an outgoing message has been entered, a user may activate this button to transmit the message to one or more remote devices (such as a messaging server).

FIG. 4A further shows that outgoing message input field 406 includes a graphical attach button 412. When this button is activated, a user may select a media item to attach to the message. Accordingly, activation of this button may cause a tool (such as a file browser) to open and allow the user to select a media item for attachment to the outgoing message.

Media item history field 408 provides a listing of media items attached to previously received messages. This listing may be in the form of graphics (e.g., icons) and/or text. The graphics may indicate media item types (e.g., image, video, audio, web page, application file, etc.), while the text may provide names of the media attachments. A user may select one of these items for output. Such output may be in media item field 404.

In embodiments, media item history field 408 lists these items sequentially. Further, these items may be arranged in a scrolling list that extends beyond the viewing boundaries of filed 408. Accordingly, scroll buttons 416a and 416b allow a user to scroll (backwards and forwards) through the listed items.

FIGS. 4B-4E provide operational examples involving the graphical user interface of FIG. 4A. In particular, FIGS. 4B-4E show a sequence of messages exchanged during a conversation thread. This exchange may be through a messaging server, such as messaging server 120 or messaging server 204. The conversation thread has members User1, User2, and User3. These drawings show interface console 400 for the device of User1.

As shown in FIG. 4B, User1 receives two incoming messages: a first message from User2 and a second message from User3. The incoming message from User2 includes the text "Here's a picture of my new car. Do you like it?" In addition, the incoming message includes an attached media item (an image file) indicated as <<pic15>>. This text and indicator are displayed in incoming message text field 402.

This attached media item is an image of a car. FIG. 4B shows that the image is displayed in media item field 404. Additionally, this image is displayed in incoming message text field 402 and outgoing message input field 406. To prevent the image from obscuring the text in fields 402 and 406, the image may be rendered with a degree of transparency in these fields. The image may be rendered with a degree of transparency in field 404 as well. However, the embodiments are not limited to this display technique. For instance, images may alternatively be displayed only in field 404.

FIG. 4B shows that the incoming message from User3 only contains the text "Very nice!" As this incoming message arrived after the message from User2, it is displayed beneath the message from User2.

FIG. 4B further shows a listing of media item indicators 414*a*-*g* in media item history field 408. Although shown as squares, these indicators may include graphical objects and/or text, as described above. In this example, indicators 414*a*-*g* are arranged in chronological sequence from left to right. Thus, indicator 414*g* corresponds to the most recently received media item, which is <<pic15>>.

Also in FIG. 4B, User1 has generated a message in outgoing message input field 406. This message includes the text "I like it too." This message is sent upon activation of send button 410.

FIG. 4C shows interface console 400 upon receipt of subsequent messages. In particular, FIG. 4C shows that a two more incoming messages have been received. The first message is the message originated by User1 in FIG. 4B. The second message was originated by User2 and includes the text "Listen to the engine." Also, the incoming message includes an attached media item (an audio file) indicated as <<audio04>>. This text and indicator are displayed in incoming message text field 402.

As shown in FIG. 4C, a media player 422 is provided to the user in media item field 404. With this player, the user may play the attached audio file. This may be performed through activation of the media player (e.g., activation of a graphical play button. However, in embodiments, playing of the audio file may commence automatically.

FIG. 4C further shows that the listing of media item indicators in media item history field 408 has been updated. In particular, this listing includes an indicator 414*h*. This indicator corresponds to the attached audio file <<audio04>>.

Also in FIG. 4C, user1 has generated an outgoing message in field 406 having the text "Sounds good!" This message is sent upon activation of send button 410.

In FIG. 4D, two subsequent messages are received. The first message is the message sent by User1 in FIG. 4C ("Sounds good!"). The second message is a message originated by User3. This message includes the text "My flight information is at the attached website." In addition, this message includes an attached media item (a URL)<<URL05>>.

As shown in FIG. 4D, a browser 424 is provided to the user in media item field 404. With this browser, web page corresponding to the attached URL is displayed. This accessing and displaying of the web page may be automatically performed without user interaction.

FIG. 4D further shows that the listing of media item indicators in media item history field 408 has been updated. In particular, this listing includes an indicator 414*i*. This indicator corresponds to the attached URL <<URL05>>.

In response to this message from User3, FIG. 4D shows that User1 generates a message in field 406 having the text "Thanks!" This message is sent upon activation of send button 410. After this message is sent, FIG. 4E shows that it is displayed in incoming message text field 402.

As described above, the message exchange of FIGS. 4B-4E may be stored by a messaging server. In further embodiments, individual devices may store messages of a conversation thread (e.g., as they are received). Thus, after the conversation thread has ended, the messages and/or media may be consolidated and viewed within the messaging (or chat) context.

Moreover, the features described herein may create a media album associated with a conversation thread. For example, FIGS. 4A-4E show the media exchanged during a thread being indicated sequentially in media item history field 408. User selection of these indicators (e.g., during a "live" conversation thread or when reviewing a past conversation thread) may cause the corresponding content to be output in media item field 404. Also, as described above, such content (e.g., images) may be further output in fields 402 and 404.

A further scenario employing the techniques described herein involves a group conversation about a party. A user can send a calendar entry or evite inviting people to the party. Further the user can establish a conversation thread that includes the party's guests. At this point, a group conversation (exchange of messages) can ensue about the upcoming party, and continue during the party. This conversation may involve the exchange of messages having attached media items (e.g., pictures, video, etc.). At the end of the conversation thread, a full history of the party has been captured and stored (e.g., by a messaging server). This history may be subsequently reviewed, shared and preserved.

The scenarios described herein are provided as examples, and not as limitations. Accordingly, embodiments may include other scenarios and uses. For instance, embodiments may include conversation threads having two users. Thus, such conversation threads may involve a one-on-one exchange of messages between the two users.

Also, the techniques described herein may involve various forms of messages and messaging protocols (e.g., mobile, instant messaging, SMS, MMS, etc.). The embodiments, however, are not limited to these examples.

Figure 5:
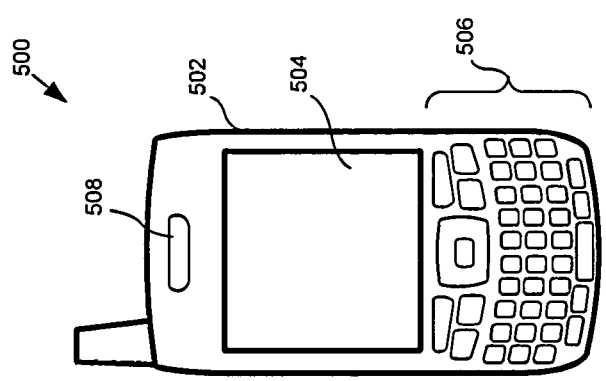
FIG. 5 is a view of an exemplary handheld device.

FIG. 5 provides a view of an exemplary handheld device 500, which may include apparatus 100 of FIG. 1. In particular, FIG. 5 is a front view that shows device 500 having a case 502. Further, this view shows device 500 having a display (e.g., a touch screen) 504, a keypad 506 (including, for example, a QWERTY keyboard, navigation buttons, and so forth), and a speaker 508. With reference to FIG. 1, these components may be included in user interface 104. Also, with reference to FIGS. 4A-4E, interface console 400 may be displayed on display 504. The view of FIG. 5 is provided for the purposes of illustration, and not limitation. Thus, embodiments may include further devices, handheld or otherwise.

As described above, embodiments may include storage media, such as storage medium 118 and storage medium 210. Such storage media may be implemented in various ways. For example, such storage media may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of storage medium 118 may be included in other elements of apparatus 100. For instance, some or all of storage medium 118 may be included on a same integrated circuit or chip with elements of apparatus 100 (e.g., host processor 208). Alternatively, some portion or all of storage medium 118 may be disposed on an integrated circuit or other medium (e.g., a hard disk drive) that is external. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
   a communications interface module to receive an incoming message of a conversation thread, the incoming message is originated by a remote device and includes a text portion and an attached media item;
   a content generation module to provide the content of the attached media; and
   a messaging module to automatically output the incoming message to a user interface in an output format, the output format comprising the text portion and content of the attached media item, the messaging module to provide an interface console for display by a display device, the interface console comprising a first field to display the text portion of the incoming message, a second field to display content of the attached media item, and a third field to display a listing of media items included in received messages, the listing of media items arranged in a chronological sequence in order received from the remote device;
   wherein the messaging module further comprises:
      an attachment module to select the content generation module based on one or more characteristics of the attached media;
      a thread management module to generate messages pertaining to conversation threads;
      a message processing module to obtain the incoming message from the communications interface module.

2. The apparatus of claim 1, the messaging module to obtain an outgoing message generated by a user of the apparatus.

3. The apparatus of claim 2, the messaging module to attach a selected media item to the outgoing message, the selected media item chosen by the user of the apparatus.

4. The apparatus of claim 2, the communications interface module to send the outgoing message to a messaging server.

5. The apparatus of claim 2, the interface console comprising a fourth field to display the text of the outgoing message.

6. The apparatus of claim 1, wherein a user of the apparatus and a user of the remote device are members of the conversation thread.

7. The apparatus of claim 1, the attached media item comprising at least one of: a video file, an audio file, an image file, a resource locator, and an application file.

8. A method, comprising:
receiving an incoming message of a conversation thread, the incoming message is originated by a remote device and includes a text portion and an attached media item;
providing content of the attached media item;
selecting content generation based on one or more characteristics of the attached media;
generating messages pertaining to the conversation thread;
obtaining the incoming message from the communications interface module;
automatically outputting the incoming message to a user interface in an output format, the output format comprising the text portion and content of the attached media item; the output format further comprising a listing of media items included in received messages, the listing of media items arranged in a chronological sequence in order received from the remote device.

9. The method of claim 8, further comprising obtaining an outgoing message generated by a user.

10. The method of claim 9, further comprising attaching a media item to the outgoing message, the media item selected by the user.

11. The method of claim 9, further comprising sending the outgoing message to a remote device.

12. The method of claim 9, the automatically outputting the incoming message to the user interface comprising:
displaying the text of the incoming message in a first field of an interface console;
displaying content of the attached media item in a second field of the interface console; and
displaying the text of the outgoing message in a third field of the interface console.

13. The method of claim 12, further comprising displaying the listing of media items included in received messages in a fourth field of the interface console.

14. The method of claim 8, the attached media item comprising at least one of: a video file, an audio file, an image file, a resource locator, and an application file.

15. A system comprising:
a messaging server;
a user device to exchange messages of a conversation thread with remote devices through the messaging server, the server to store the messages of the conversation thread, the user device including a communications interface module to receive an incoming message of the conversation thread, the incoming message including a text portion and an attached media item;
a content generation module to provide the content of the attached media; and
a messaging module to automatically output the incoming message to a user interface in an output format, the output format comprising the text portion and content of the attached media item, and a listing of media items included in received messages, the listing of media items arranged in a chronological sequence in order received from the remote devices,
wherein the messaging module further comprises:
an attachment module to select the content generation module based on one or more characteristics of the attached media;
a thread management module to generate messages pertaining to conversation threads;
a message processing module to obtain the incoming message from the communications interface module.

16. An article comprising a non-transitory computer-readable storage medium containing instructions that when executed enable a system to:
receive an incoming message of a conversation thread, the incoming message to be originated by a remote device and includes a text portion and an attached media item;
providing content of the attached media item;
selecting content generation based on one or more characteristics of the attached media;
generating messages pertaining to the conversation thread;
obtaining the incoming message from the communications interface module; and
automatically output the incoming message to a user interface in an output format, the output format comprising the text portion and content of the attached media item, and a listing of media items included in received messages, the listing of media items arranged in a chronological sequence in order received from the remote device.

17. The article of claim 16, wherein the computer-readable storage medium contains instructions that when executed enable the system to:
obtain an outgoing message generated by a user;
attach a media item to the outgoing message, the media item selected by the user; and
send the outgoing message to the remote device.

18. The apparatus of claim 1, the content of the attached media item comprising an image displayed in the first and second fields, a portion of the image displayed in the first field having a degree of transparency so as not to obscure the text displayed in the first field.

* * * * *